United States Patent
DeLuca et al.

(10) Patent No.: US 9,483,858 B2
(45) Date of Patent: Nov. 1, 2016

(54) TEXT RESIZING WITHIN AN EMBEDDED IMAGE

(71) Applicant: International Business Machines Corporation, Armonk, NY (US)

(72) Inventors: Lisa Seacat DeLuca, Baltimore, MD (US); Dana L. Price, Surf City, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/041,583

(22) Filed: Feb. 11, 2016

(65) Prior Publication Data

US 2016/0148410 A1    May 26, 2016

Related U.S. Application Data

(63) Continuation of application No. 14/028,778, filed on Sep. 17, 2013.

(51) Int. Cl.
| | |
|---|---|
| *G06F 17/21* | (2006.01) |
| *G06T 11/60* | (2006.01) |
| *G06F 3/0485* | (2013.01) |
| *G06K 9/00* | (2006.01) |
| *G06F 17/24* | (2006.01) |

(52) U.S. Cl.
CPC ............. *G06T 11/60* (2013.01); *G06F 3/0485* (2013.01); *G06K 9/00456* (2013.01); *G06K 9/00463* (2013.01)

(58) Field of Classification Search
CPC ...................................................... G06F 17/00
USPC ....................................................... 715/271
See application file for complete search history.

(56) References Cited

U.S. PATENT DOCUMENTS

| | | | |
|---|---|---|---|
| 6,400,845 B1 * | 6/2002 | Volino | G06K 9/2054 358/462 |
| 6,788,308 B2 | 9/2004 | Reavy et al. | |
| 7,272,258 B2 | 9/2007 | Berkner et al. | |
| 7,496,230 B2 | 2/2009 | Chen et al. | |
| 7,912,289 B2 | 3/2011 | Kansal et al. | |
| 8,203,577 B2 | 6/2012 | Hoover | |
| 8,442,324 B2 * | 5/2013 | Bates | G06K 9/325 382/181 |
| 2002/0120653 A1 | 8/2002 | Kraft et al. | |
| 2006/0034533 A1 * | 2/2006 | Batchvarov | G06T 3/4053 382/245 |
| 2006/0103667 A1 | 5/2006 | Amit et al. | |
| 2008/0273796 A1 | 11/2008 | Kansal et al. | |
| 2011/0113323 A1 * | 5/2011 | Fillion | G06F 17/211 715/252 |

(Continued)

OTHER PUBLICATIONS

Anonymous, "System and method of reorganizing text in image (screen shot or picture) with the image is being resized", An IP.com Prior Art Database Technical Disclosure, IP.com No. IPCOM000215227D, IP.com Electronic Publication: Feb. 22, 2012, 13 pgs.

(Continued)

*Primary Examiner* — James J Debrow
(74) *Attorney, Agent, or Firm* — Kristofer L. Haggerty

(57) ABSTRACT

A computer receives user preferences. The computer receives a document, wherein the document includes an image. The computer determines that the image contains embedded text. The computer determines that the embedded text does not satisfy the received user preferences. The computer modifies the embedded text to satisfy user preferences.

1 Claim, 6 Drawing Sheets

(56) References Cited

U.S. PATENT DOCUMENTS

2011/0161806 A1   6/2011   Stern et al.
2011/0167353 A1*  7/2011   Grosz ................ G06F 17/3028
                                                      715/738
2012/0089942 A1   4/2012   Gammon

OTHER PUBLICATIONS

DeLuca et al., "Text Resizing Within an Embedded Image," U.S. Appl. No. 14/028,778, filed Sep. 17, 2013, IBM Docket No. END920130103US1.

* cited by examiner

TEXT RESIZING WITHIN AN EMBEDDED IMAGE

FIELD OF THE INVENTION

The present invention relates generally to image editing, and more particularly to an embedded text editing system that resizes the text within an embedded image, according to user preferences, while leaving the image intact.

BACKGROUND

Text and textual information proliferates everyday life. Text presented in spreadsheets and documents shared amongst coworkers and in images may be incomprehensible for several reasons. For example, text in an image may be too small for observation putting a strain on the reader's eyes. Currently, there are programs such as Adobe Photoshop® (Adobe Photoshop is a registered trademark of Adobe Systems Incorporated) that enables users to select a region around text embedded in an image and resize the selected region. Users may also increase the size of the entire image to adjust the text to a readable size. However, enlarging the entire image to make the text readable can result in the image being enlarged to the point that the edges are no longer viewable.

SUMMARY

Embodiments of the present invention provide a system, method, and program product for modifying text embedded within an image. A computer receives user preferences. The computer receives a document, wherein the document includes an image. The computer determines that the image contains embedded text. The computer determines that the embedded text does not satisfy the received user preferences. The computer modifies the embedded text to satisfy user preferences.

DETAILED DESCRIPTION

Figure 1:
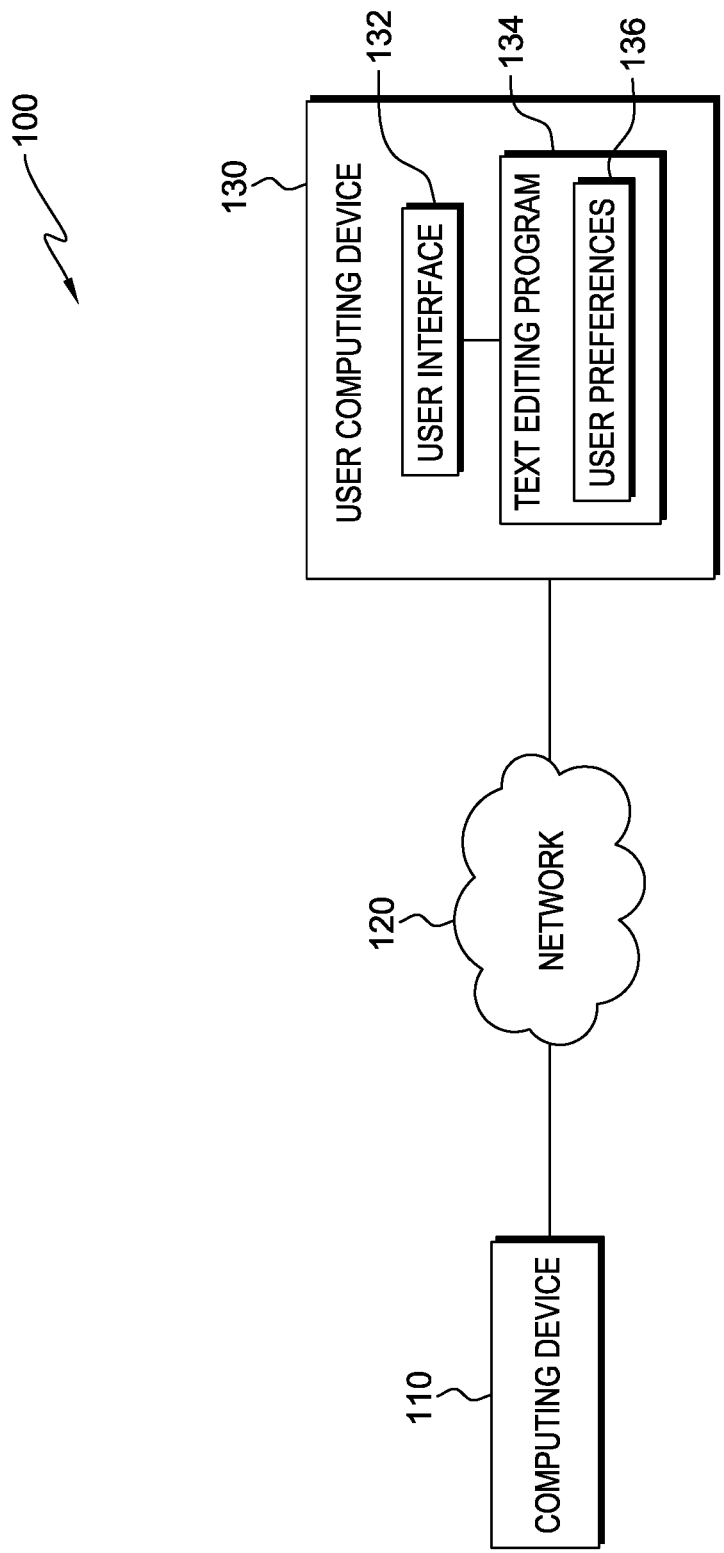
FIG. 1 is a functional block diagram illustrating an embedded text editing system in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system". Furthermore, aspects of the present invention may take the form of a computer program product embodied in one or more computer-readable medium(s) having computer-readable program code/instructions embodied thereon.

Any combination of one or more computer-readable medium(s) may be utilized. The computer-readable medium may be computer-readable signal medium or a computer-readable storage medium. A computer-readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms including, but not limited to, electro-magnetic, optical, or any suitable combination thereof. A computer-readable signal medium may be any computer-readable medium that is not a computer-readable storage medium that can communicate, propagate, or transport a program for use by or in connection with an instruction execution system, apparatus, or device.

Program code embodied on a computer-readable medium may be transmitted using any appropriate medium including, but not limited to, wireless, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates text editing system 100, in accordance with an embodiment of the invention. In an exemplary embodiment, text editing system 100 includes computing device 110 and user computing device 130, all interconnected via network 120.

In an exemplary embodiment, network 120 is the Internet, representing a worldwide collection of networks and gateways to support communications between devices connected to the Internet. Network 120 may include, for example, wired, wireless, or fiber optic connections. In other embodiments, network 120 may be implemented as an intranet, a local area network (LAN), or a wide area network (WAN). In general, network 120 can be any combination of connections and protocols that will support communications between computing device 110 and user computing device 130.

In the exemplary embodiment, computing device 110 may be a desktop computer, a notebook, a laptop computer, a tablet computer, a handheld device, a smart phone, a thin client, or any other computing device or computing system capable of receiving and sending data to and from other computing devices, such as user computing device 130. Computing device 110 may be comprised of a cluster of plurality of computing devices working together or working separately. Computing device 110 is described in more detail with reference to FIG. 6.

In the exemplary embodiment, user computing device 130 may be a laptop computer, tablet computer, notebook computer, personal computer (PC), a desktop computer, a personal digital assistant (PDA), a smart phone, or any programmable electronic device capable of communicating with computing device 110 via network 120. In the exemplary embodiment, user computing device 130 includes text editing program 134 and user interface 132. User computing device 130 may include internal and external hardware components, as depicted and described in further detail with respect to FIG. 6.

In the exemplary embodiment, user interface 132 includes components used to receive input from user of user computing device 130 and transmit the input to text editing program 134. User interface 132 uses a combination of technologies, such as device drivers, to provide a platform to enable users to interact with text editing program 134. In the exemplary embodiment, user interface 132 receives input such as textual input received from a physical input device such as a keyboard, via a device driver that corresponds to the physical input device.

Text editing program 134 includes user preferences 136. In the exemplary embodiment, text editing program 134 is software capable of receiving data, such as text documents and web pages from network 120. Text editing program 134 is also capable of transmitting data to other computing devices, such as computing device 110 via network 120.

In the exemplary embodiment, user preferences 136 is data input by a user of user computing device 130 via user interface 132 that defines when text editing program 134 should edit text or embedded text present in data, such as a text document, presentation, or web page. In other embodiments, user preferences 136 may be received from another computing device, such as computing device 110, via network 120. In the exemplary embodiment, user preferences 136 includes data which defines a preferred minimum text size by way of defining a range of text size values where text editing program 134 is instructed to modify the size of the text to a preferred text size and data which defines one or more preferred font or text style preference by way of defining font or text style options where text editing program 134 is instructed to modify the font and/or text style of the text present. User preferences 136 are discussed in further detail with regard to FIG. 2.

Figure 2:
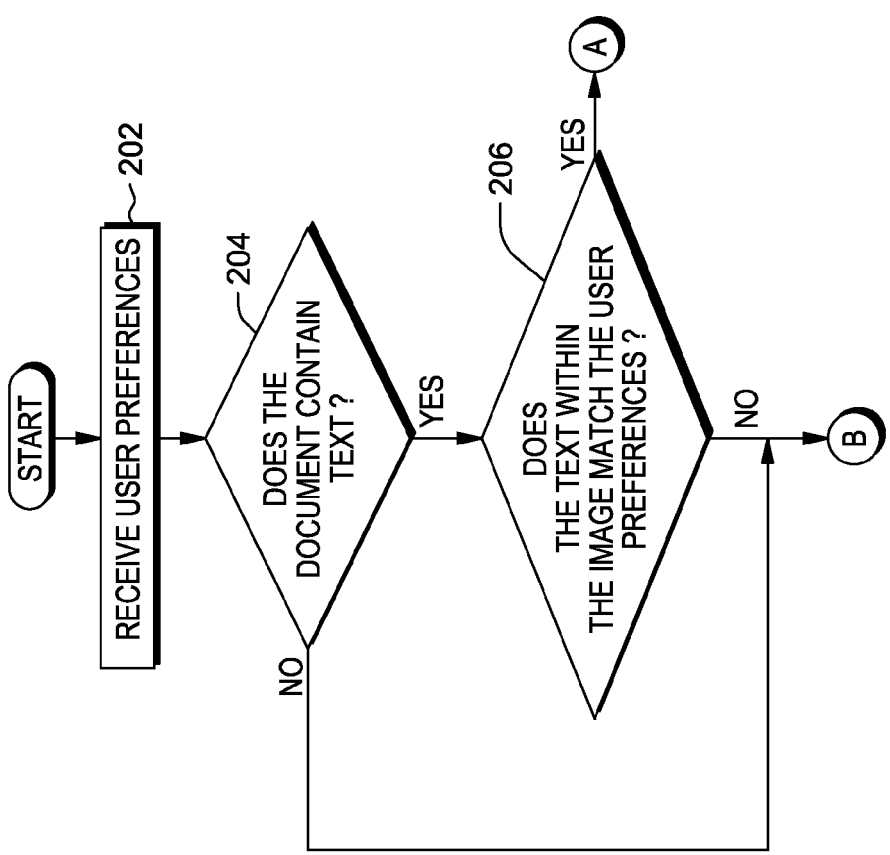
FIGS. 2, 3 and 4 are flowcharts depicting the operational steps of the text editing program of FIG. 1 in analyzing and resizing text based on user preferences, in accordance with an embodiment of the present invention.
Figure 3:
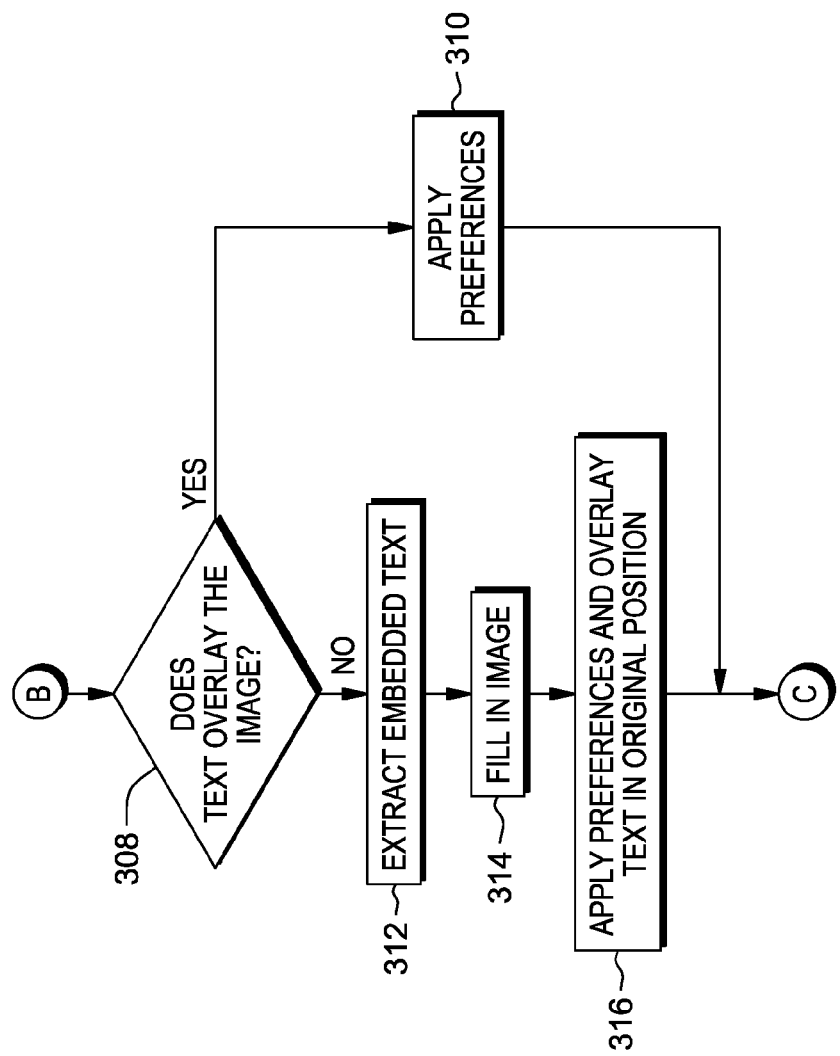
Figure 4:
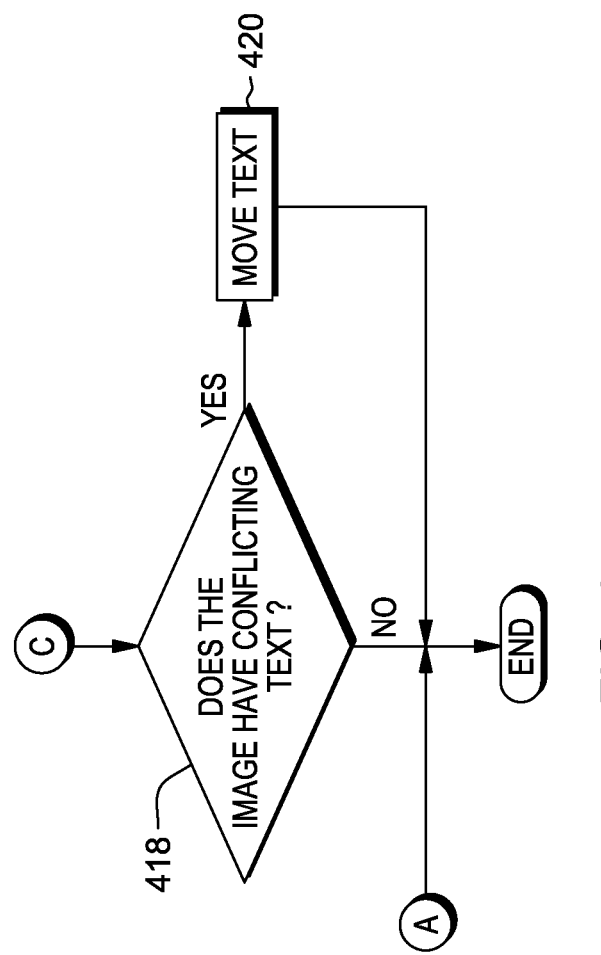

FIG. 2 is a flowchart illustrating the operational steps of text editing program 134 in modifying text in an image, according to user preferences, in accordance with an embodiment of the invention. In the exemplary embodiment text editing program 134 receives a document that contains an image from computing device 110 via network 120. In the exemplary embodiment, the term image refers to a depiction that is static, such as a screenshot, where a portion of the image or items depicted within the image cannot be individually modified without additional manipulative steps; however, the image as a whole may be modified. For example, a screenshot of a desktop pasted into a word processor may be readily modified by the word processor; however, an individual icon depicted within the screenshot may not be readily modified by the word processor, such as re-sized, without modifying the screenshot as a whole. In other embodiments, the document may contain multiple images. In addition, in other embodiments, the document may be uploaded to computing device 130 from a data storage device.

Text editing program 134 then receives input, i.e., user preferences 136, from the user of computing device 130 (block 202). In the exemplary embodiment, user preferences 136 includes a preferred minimum text size and a preferred font style, with the preferred font style including one or more of a preferred text style (i.e., Times New Roman text style), a preferred text color, a preferred sharpness of the text and a preferred edge detail. For example, if the user of computing device 130 prefers text to have a minimum text size of 12, the user can input this information into the text editing program 134 via user interface 132. This input instructs text editing program 134 to modify any text encountered below a 12 point text size to a 12 point text size. In other embodiments, the user of computing device 130 may input a preferred text size rather than a preferred minimum text size. In this other embodiment, the input instructs text editing program 134 to modify any text encountered that is not at least 12 point text size to a 12 point text size.

Text editing program 134 then determines if the image in the received document contains text (decision block 204). In the exemplary embodiment, text editing program 134 detects text within the image by using, for example, optical character recognition (OCR) software that scans images for handwritten, typewritten, or printed text and isolates the text for editing. For example, if user computing device 130 receives a document containing an image, text editing program 134 analyzes the image using OCR and determines whether there is text contained in the image. If text editing program determines that the image in the received document does not contain any text then there is no text to modify and therefore, text editing program 134 does not perform any modifications (decision block 204, "NO" branch).

If text editing program 134 determines that the image in the received document does contain text (decision block 204, "YES" branch), text editing program 134 then determines if the text in the image satisfies user preferences 136 (decision block 206). In the exemplary embodiment text editing program 134 satisfies user preferences 136 if the text in the image does not fall within the defined range of text size values where text editing program 134 is instructed to modify the text size and if the font or style of the text does not match any of the defined font or style options, where text editing program 134 is instructed to modify the font or style of the text. For example, if the text in the image has a 10 point text size and user preferences 136 instructs text editing program 134 to modify any text that is below a 12 point text size to a preferred text size, then the text does not satisfy user preferences. If text editing program 134 determines that the text in the image does satisfy user preferences 136 (decision block 206, "YES" branch) then the text satisfies the preferences desired by the user of computing device 130 and therefore text editing program 134 does not modify the text size or font style of the text.

If text editing program 134 determines the text in the image does not satisfy user preferences 136 (decision block 206, "NO" branch), text editing program 134 determines if the text overlays the image (decision block 308).

In the exemplary embodiment, text editing program 134 determines if the text overlays the image by determining if the text is a separately selectable entity from the image. For example, if text is contained in a text box which is separately selectable from the image, the text is overlaid on top of the image. However, if the text is not separately selectable from the image and is therefore embedded within the image, the text is static (decision block 308, "NO" branch).

If text editing program 134 determines that the text overlays the image (decision block 308, "YES" branch), text editing program 134 modifies the text so that the text satisfies user preferences 136 (block 310). Referring to the example above, if the encountered text in the image is 10 point text and text editing program 134 determines that the text overlays the image, text editing program 134 re-sizes the 10 point text to the preferred minimum 12 point text size described in user preferences 136.

If text editing program 134 determines the text does not overlay the image (decision block 308, "NO" branch), text editing program 134 determines the text is static. For example, if text editing program 134 determines that the image and text are one entity, i.e. the text is not a separately selectable entity from the image, text editing program 134 determines that the text is embedded within the image and therefore static text. Static text is text that is not a separate selectable entity but rather is fully embedded within the image and therefore cannot be modified independently from the image. If text editing program 134 determines that the text does not overlay the image (decision block 308, "NO" branch), text editing program 134 extracts the text from the image (block 312). In the exemplary embodiment, in order to prevent the image from corruption during the text extraction, photo editing software such as Adobe Photoshop® (Adobe Photoshop is a registered trademark of Adobe Systems Incorporated) is utilized to fill in the holes in the image left behind by the extracted text by way of photo correction principles (block 314). Text editing program 134 then modifies the text to satisfy user preferences 136 in the manner described above and overlays the text back in the original position atop the image (block 316). For example, with regard to the aforementioned example, if text editing program 134 determined the encountered 10 point text is embedded within the image and therefore static, text editing program 134 extracts the text, utilizes photo correction software, modifies the text to the minimum 12 point text size and overlays the modified text back in the original position atop the image.

Text editing program 134 then determines if the text is conflicting (decision block 418). In the exemplary embodiment, conflicting text refers to text which no longer fits within a graphic present in the image after the text is re-sized or text which no longer fits in a legible manner within the text box. For example, if an image contains a graphic, such as a pie graph or picture, which in turn contains embedded text which does not satisfy user preferences 136, after text editing program 134 extracts, re-sizes the text to satisfy user preferences 136 and overlays the text atop the graphic, as described above, if the re-sized text does not fit within the boundaries of the graphic, then the text is conflicting text. In addition, text may also be conflicting if text re-sized by text editing program 134 in order to satisfy user preferences 136, no longer fits within the text box in an easily legible manner. For example, if a single word of the re-sized text does not fit within the text box without being split or hyphenated, then the text is also conflicting.

If text editing program 134 determines the image contains conflicting text (decision block 418, "YES" branch), text editing program 134 presents the user with the option to move the text outside of the image and add arrows to point to the text's original location or to add a scroll bar to the text box containing the text so that a user can view all the text contained within the text box (block 420). In the exemplary embodiment, the user of computing device 130 can input the desired option into text editing program 134 via user interface 132.

If text editing program 134 determines the image does not contain conflicting text (decision block 418, "NO" branch), then text editing program 134 does not perform any modifications.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 5:
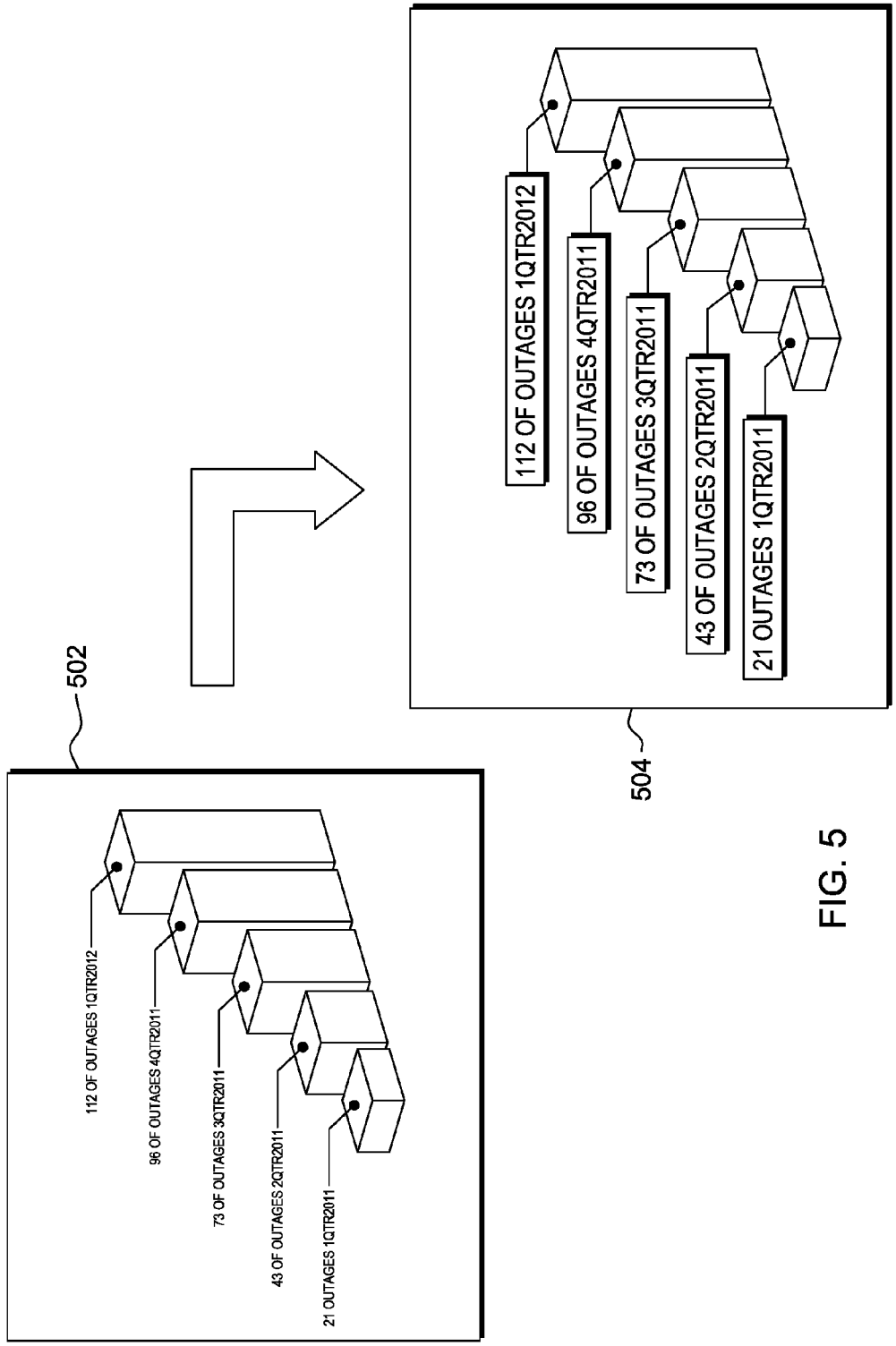
FIG. 5 is an illustration depicting the resizing of text within an image, in accordance with an embodiment of the present invention.

FIG. 5 illustrates the modification of static text within image 502 by text editing program 134 to satisfy user preferences 136. In the exemplary embodiment, since the text in image 502 is not a separately selectable entity from image 502, the text is static text. Therefore, text editing program 134 modifies the text to satisfy user preferences 136 by extracting the text, modifying the text to satisfy user preferences 136 (increasing the size of the text), and overlaying the text atop the image in the original position of the text, as depicted by image 504. In addition, as depicted in image 504, when the text is overlaid, the text is contained in separately selectable text boxes.

Figure 6:
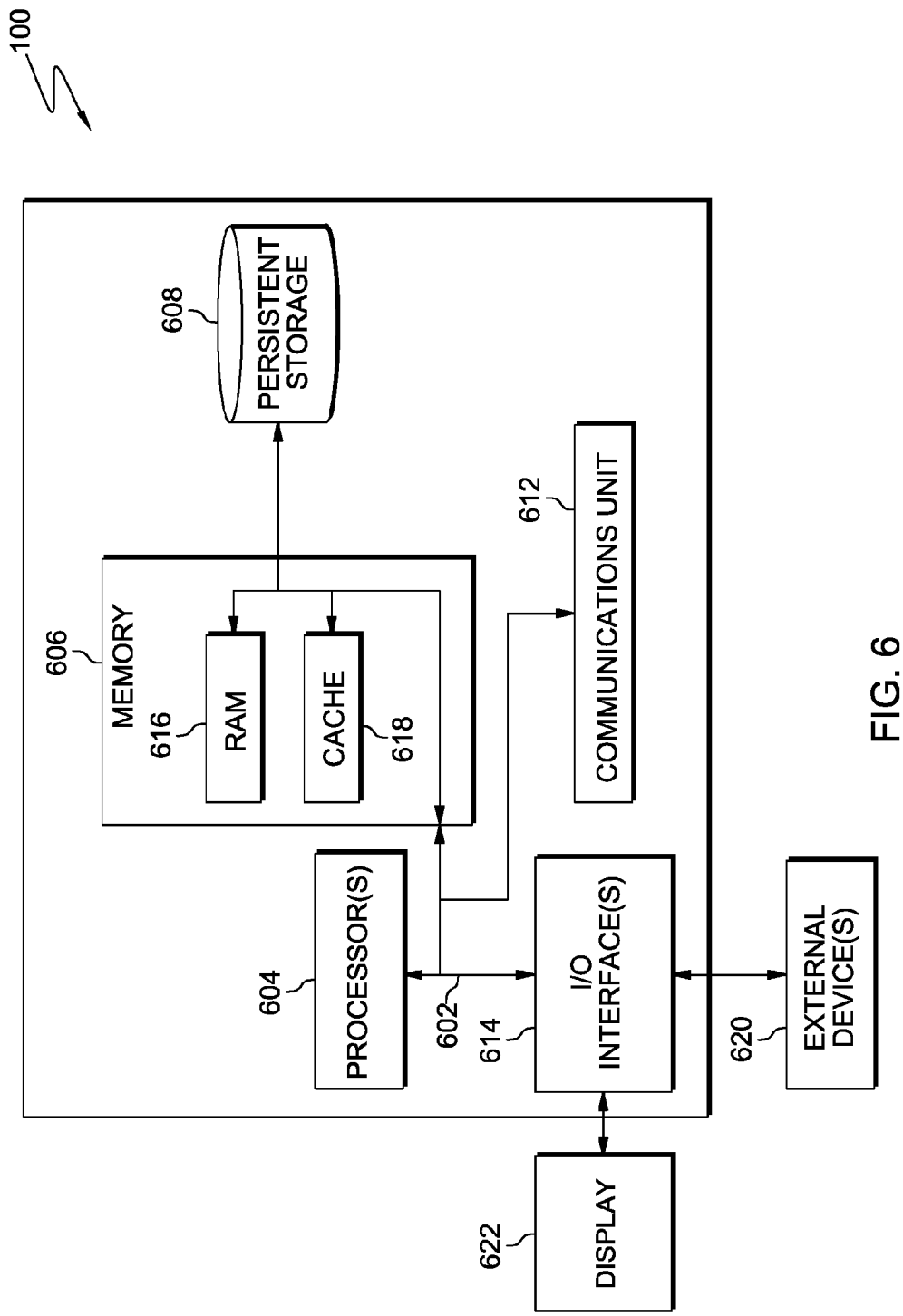
FIG. 6 is a block diagram depicting the hardware components of the text enhancement system of FIG. 1, in accordance with an embodiment of the invention.

FIG. 6 depicts a block diagram of components of computing device 110 and user computing device 130 in accordance with an illustrative embodiment of the present invention. It should be appreciated that FIG. 6 provides only an illustration of one implementation and does not imply any limitations with regard to the environments in which difference embodiments may be implemented. Many modifications to the depicted environment may be made.

Computing device 110 and user computing device 130 include communications fabric 602, provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage memory.

The programs text editing program 134, user interface 132 and user preferences 136 in user computing device 130 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent memory 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems of devices. In these examples, communications unit 612 includes one or more network interface cards. Communications unit 612 may provide communications through the use of either or both physical and wireless communications links. The program text editing program 134, user interface 132, and user preferences 136 in user computing device 130 may be downloaded to persistent storage 608 through communications unity 612.

I/O interface(s) 614 allows for input and output of data with other devices that may be connected to computing device 110 and user computing device 130. For example, I/O interface 614 may provide a connection to external devices 620 such as a keyboard, keypad, a touch screen, and/or more other suitable input device. External devices 620 may also include portable computer-readable storage media such as, for example, thumb drives, portable optical or magnetic disks, and memory cards. Software and data used to practice embodiments of the present invention, e.g., the programs text editing program 134, user interface 132 and user preferences 136 in user computing device 130 can be stored on such portable computer-readable storage media and can be loaded onto persistent storage 608 via I/O interface(s) 614. I/O interface(s) 614 can also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should be also noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for modifying text embedded within an image, comprising the steps of:
   a computer receiving user preferences;
   the computer receiving a document, wherein the document includes an image;
   the computer utilizing optical character recognition to determine that the image contains text;
   the computer determining that the text does not satisfy the user preferences;
   the computer determining that the text is embedded in the image;
   the computer extracting the embedded text;
   the computer utilizing photo correction software to fill in one or more portions of the image that have been corrupted as a result of the extraction of the embedded text;
   the computer modifying the embedded text to satisfy the user preferences;
   the computer determining that the modified embedded text conflicts with the image by determining that the modified embedded text does not fit an original footprint of the text within the image; and
   the computer prompting a user selection to overlay the modified embedded text in a position that includes at least one of: within the original footprint of the text within a scrollable text box and within a text box outside of the image while utilizing indicators to identify the original footprint of the text.

* * * * *